LOGICAL N OUT OF M CODE CHECK CIRCUIT

Filed Oct. 26, 1960

INVENTOR
JIRO OKUDA
BY Roy C. Hopgood
ATTORNEY

United States Patent Office
3,155,841
Patented Nov. 3, 1964

3,155,841
LOGICAL N OUT OF M CODE CHECK CIRCUIT

Jiro Okuda, Tokyo, Japan, assignor to Nippon Electric Company Limited, Tokyo, Japan, a corporation of Japan Filed Oct. 26, 1960, Ser. No. 65,226
Claims priority, application Japan Oct. 28, 1959
4 Claims. (Cl. 307—88.5)

This invention relates to means for checking information in an information processing apparatus and more particularly to circuits for checking coded information to ascertain whether or not the information manifestations are congruent with the chosen code.

In an electrical or electronic telephone exchange or computer or other information processing apparatus, it is essential before transmitting applied information to check whether or not the information is trouble-free. For this purpose, various self-checking coding systems have been used, such as the so-called 2 out 5 coding system in which any two out of five inputs are distinguishably significant.

An object of the invention is to provide a novel circuit for checking information for distinguishable codal manifestation of any $n$ out of $m$ inputs. Compared to other checking circuits, the novel circuit provided by this invention is characterized by fewer parts and by stability of performance.

More specifically, the invention provides means for converting digital type input signals into analog electrical effects, applying these effects to a transistor circuit to open or close a gate connected to the transistor circuit, and deriving through the gate a selective manifestation of whether the input signals are more than, less than, or equal to a given number of $n$ signals. According to the invention, the collector-base diode in the transistor will be varied in resistance according to the number of input and such variation will be effective to control means for detecting the relation of the number of input signals to a given number $n$ of signals.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
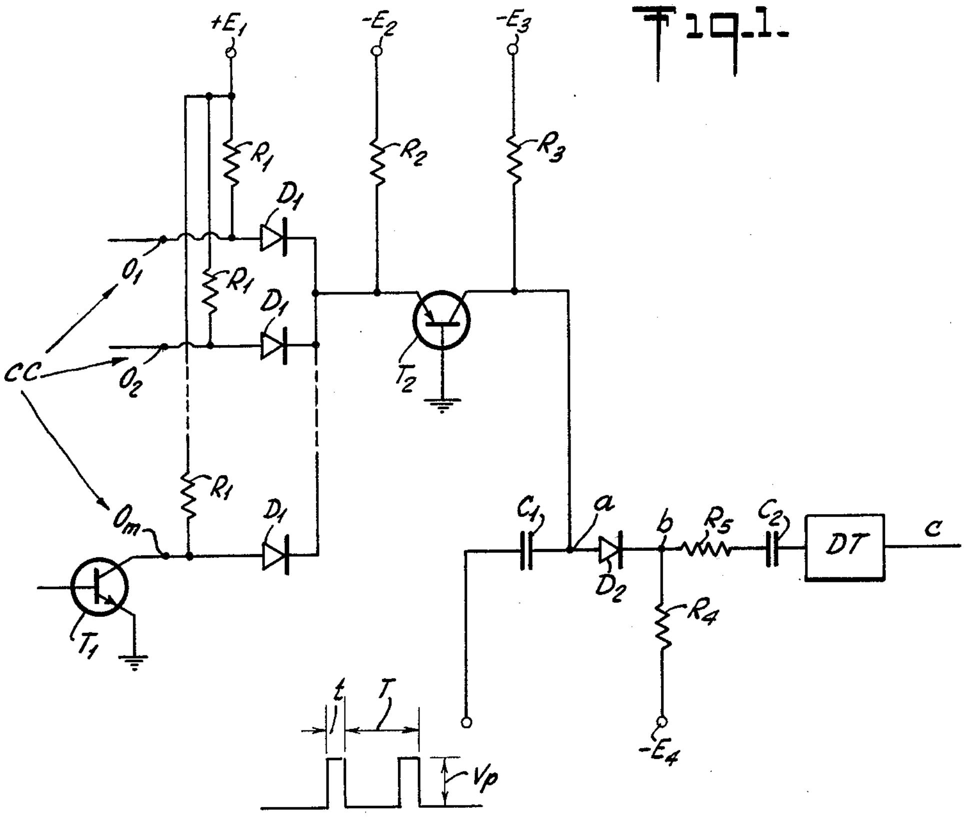
FIG. 1 is a schematic showing of an example of the novel checking circuit.

Referring to FIG. 1, a given item or character of an information word enters the checking circuit from a logical circuit CC, the one shown being representative of a plurality of such circuits respectively allocated to character places in the information word or words. Each circuit CC includes output terminals $O_1$, $O_2$ . . . $O_m$ for an $m$ number of code positions. In practice, for an electronic communication exchange, the information to be checked may concern, for instance, an equipment number of a subscriber or a dialed subscriber number. Each character of such information appears in the allocated logical circuit CC through gates and amplifiers in a control circuit (not shown). The code bits designating the character are applied by the control circuit to appropriate ones of the output terminals $O_1$ to $O_m$ through transistors, the transistor $T_1$ shown connected to terminal $O_m$ being typical. Each code position may be either in written-in state "1" or in blank state "0." The transistor $T_1$ in each output circuit is so set that it manifests state "1" when in cut-off state and manifests "0" when in conductive state.

The checking circuit includes resistors $R_1$ respectively connecting the output terminals of logical circuit CC with a source voltage $+E_1$. The input leads from the circuit CC into the checking circuit are further respectively connected via diodes $D_1$ to the emitter of a transistor $T_2$ in the checking circuit. This emitter connects via a resistor $R_2$ to source voltage $-E_2$. The collector of $T_2$ is connected via a resistor $R_3$ to source voltage $-E_3$. The base of $T_2$ is grounded.

For simplicity of explanation, the 2 out of $m$ coding system will be specifically considered. The checking circuit, therefore, will be required to check the information manifested by circuit CC for congruity or correctness with the 2 out of $m$ code. This means that the checking circuit must find out whether any two only of the $m$ inputs from the circuit CC are in "1" state. In order to make the checking circuit perform such check, the following relation is necessary between the source voltages $E_1$, $E_2$, $E_3$ and $R_1$, $R_2$, $R_3$:

$$\frac{E_1}{R_1}=\frac{E_2}{R_2}=\frac{E_3}{2R_3} \tag{1}$$

Figure 2:
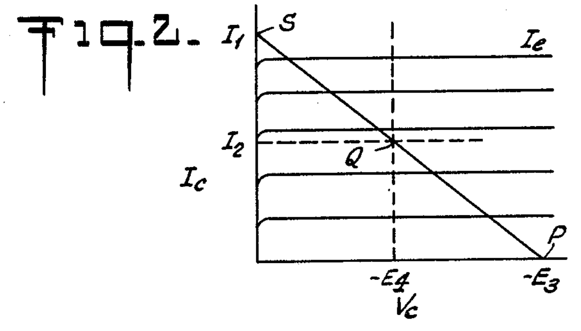
FIG. 2 shows a plot of characteristics of a transistor in the checking circuit and is useful to explain performance of the circuit.

If none or only one of the outputs $O_1$ . . . $O_m$ of the logical circuit CC is in the "1" state, no emitter current of transistor $T_2$ flows, with the result that the operating point is located at a point P of the grounded base transistor characteristics plotted in FIG. 2. If two only of the outputs are in the "1" state, current $E_1/R_1$ flows through the emitter of $T_2$, with the result that, assuming the grounded base ransistor current amplification factor of $T_2$ is very close to 1, current approximately close to the emitter current flows through the collector of $T_2$, and so the operating point moves to a point Q. If three or more of the outputs $O_1$ to $O_m$ are in the "1" state, current $2E_1/R_1$ flows through the collector, with the result that the operating point moves to a point S. Thus, the transistor $T_2$ is selectively established at one of three operating points P, Q and S according to whether less than 2, 2 only, or more than 2 of the outputs of the information manifesting circuit CC are in state "1."

The condition of $T_2$ is sensed at periodic information intervals to produce a go-ahead signal only if $T_2$ is at operating point Q, which is the case when any two only of the outputs of CC are at "1" and is indicative of correctness of information set into CC. Illustrative means, in the checking circuit, for sensing $T_2$ includes a diode gate circuit comprising a condenser $C_1$ to which test pulses $V_p$ are periodically applied, a diode $D_2$, resistors $R_4$ and $R_5$, and another condenser $C_2$ which couples the diode gate circuit to a detector circuit DT having a signal output lead $c$. The junction point $a$ between $C_1$ and $D_2$ connects to the collector of $T_2$.

Let the negative source voltage $E_4$ be $$. . . E_4=\tfrac{1}{2}E_3 \tag{2}$$

and let the peak value of test pulse $V_p$ be $$. . . V_p<E_4 \tag{3}$$

Accordingly, if the transistor $T_2$ is at operating point P (at cut off because of less than two code bits "1" being manifested by CC), the negative bias $$-(E_3-E_4)=-E_4 \tag{4}$$

is impressed on diode $D_2$ which thereby prevents a test pulse $V_p$ from passing through $C_1$ and appearing at diode output point $b$. Hence, circuit DT is not activated and does not produce a go-ahead signal on its output lead $c$.

If the transistor $T_2$ is at operating point S, which is the case if more than two code bits "1" are being manifested by CC, the transistor is either in the saturated region or extremely close to saturation. Under this condition, a low resistance by-pass is formed by the collector-diode; i.e., by the collector-base junction. Hence, although a test pulse $V_p$ in effect passes through $C_1$, it is shunted through the low resistance path afforded by the collector-base junction of $T_2$ when $T_2$ is at operating point S. Again there will be no pulse at diode $D_2$ as point *b* and circuit DT will not produce a go-ahead signal.

If transistor $T_2$ is at operating point Q, which is the case for congruity of the information manifested by CC with the chosen code, no negative bias is impressed by $T_2$ on $D_2$ and the collector-base junction of $T_2$ is at high impedance. Accordingly, a test pulse $V_p$ acts via $C_1$ in forward direction on $D_2$ and a pulse appears at point *b*. The pulse at *b* is applied via $C_2$ to DT and activates DT to produce a go-ahead signal on its output lead *c*.

Summarizing, there is no output point *b* when the operating point of transistor $T_2$ is at point P, as is the case if one or none of *m* bits or elements of input information is "1" or when the operating point of $T_2$ is at point S, which is the case if three or more of the *m* bits are "1." On the other hand, when $T_2$ is at operating point Q, which is the case only if any two only of the *m* bits are "1," a test pulse $V_p$ goes through the diode gate circuit, appears at junction *b* and renders circuit DT effective to produce a correctness manifesting signal.

In the above example, any 2 out of *m* checking has been explained, but checking of any other number of information bits, elements, or signals out of a quantity *m* can be performed by properly changing $R_2$ and $R_3$.

While the foregoing description sets forth the principles of the invention in connection with specific apparatus, it is to be understood that this description is made only by way of example and not as a limitation of the scope of the invention as set forth in the objects thereof and in the accompanying claims.

I claim:

1. An *n* out of *m* code check circuit for *m* binary state inputs comprising: a transistor having base emitter and collector electrodes; means connected between said inputs and the said emitter for converting the binary state inputs to an emitter applied analogue voltage representative of the number of inputs in one binary state; means connected to the said base and collector electrodes for biasing said transistor conductive for an analogue voltage representing *n* inputs in said one state and saturated for voltages above that value; a two terminal diode gate coupled at one terminal thereof to the collector of said transistor; and means connected across both terminals of said diode gate for the biasing thereof at cutoff only when said transistor is non-conductive; whereby when said diode gate is pulsed at the collector connected end thereof said pulse will pass through said diode gate only upon said transistor being conductive, and then only when the transistor is not saturated and the collector-base portion thereof acts as a pulse shunt.

2. The code checking circuit claimed in claim 1 in which the means for biasing said diode and a portion of the means for biasing said transistor comprises a voltage divider circuit, including said diode disposed in circuit therein, connected at the diode to the collector of said transistor.

3. An *n* out of *m* code check circuit for *m* binary state inputs comprising: a transistor having base emitter and collector electrodes; unidirectional current carrying means connecting said inputs in common; a plurality of voltage divider circuits, each including one of said unidirectional current carrying means connected in series therein, connected in common to the emitter of said transistor for the analogue biasing thereof in accordance with the binary state of said inputs; means for maintaining the base of said transistor at a fixed potential; a two terminal diode; and a voltage divider circuit including said diode disposed in series therein, connected at one terminal of the diode to the collector of said transistor; whereby when said diode is pulsed at the collector connected terminal thereof, the pulse will pass therethrough under control of the operating point of said transistor which is in turn under control of the analogue converted state of the inputs.

4. The combination with the check circuit claimed in claim 1 of a pulse source coupled to the collector-diode junction.

References Cited in the file of this patent

UNITED STATES PATENTS

| | | |
|---|---|---|
| 2,603,746 | Burkhart et al. | July 15, 1952 |
| 2,853,632 | Gray | Sept. 23, 1958 |
| 2,950,461 | Tryon | Aug. 23, 1960 |
| 3,078,376 | Lewin | Feb. 19, 1963 |

OTHER REFERENCES

"Multi-Input Exclusive OR Circuit," by F. Gallupi, in IBM Tech. Disclosure Bulletin, vol. 1, No. 2, dated August 1958, pages 40–41.

IBM Technical Disclosure Bulletin. "Validity Checking," by M. W. Sotak, vol. 1, No. 3, October 1958, page 23.